A. W. SWENDER.
CALF AND COLT WEANER.
APPLICATION FILED OCT. 3, 1917.

1,285,838.

Patented Nov. 26, 1918.
2 SHEETS—SHEET 1.

A. W. Swender, Inventor

Witness

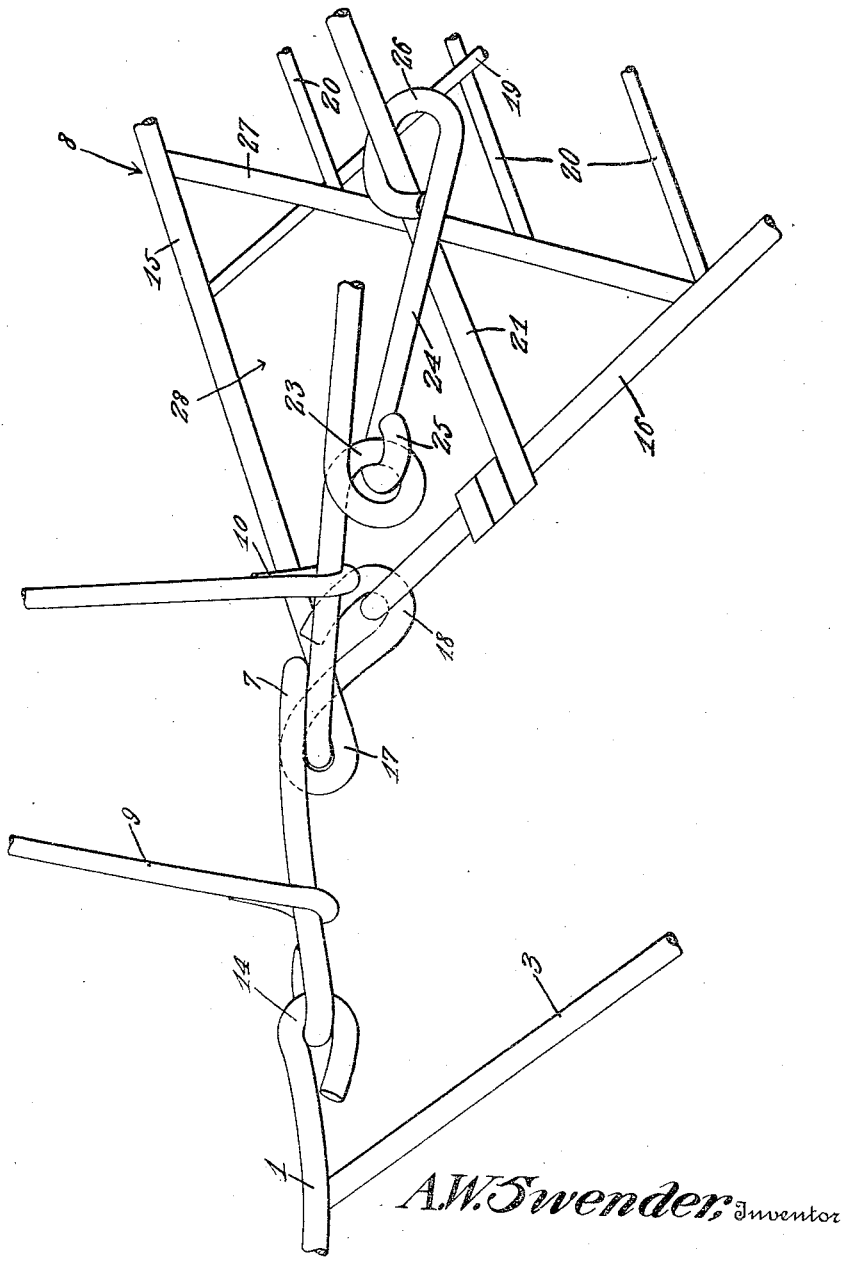

UNITED STATES PATENT OFFICE.

ALBERT W. SWENDER, OF ST. LOUIS, MISSOURI.

CALF AND COLT WEANER.

1,285,838. Specification of Letters Patent. Patented Nov. 26, 1918.

Application filed October 3, 1917. Serial No. 194,525.

*To all whom it may concern:*

Be it known that I, ALBERT W. SWENDER, a citizen of the United States, residing at St. Louis, in the State of Missouri, have invented a new and useful Calf and Colt Weaner, of which the following is a specification.

The present invention relates to weaners and muzzles for use on calves, colts and other animals, and aims to provide a novel and improved device of that character which will be humane in use, being light in weight, airy and not apt to freeze up, as well as permitting the animals to eat, graze and drink, but preventing nursing, the device also being useful upon animals permitted to graze in orchards and groves, to prevent them from gnawing trees, eating branches, etc.

Another object of the invention is the provision of a weaner including a head stall and swinging shield or guard connected thereto, to extend across the animal's mouth when the head is raised, and to swing forwardly out of the way when the head is lowered to feeding position, means being provided for locking the shield when the weaner is raised to nursing position, thereby preventing the shield from being swung out of the way by the tossing or jerking movement of the animal's head.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Fig. 3 is an enlarged fragmental elevation showing the parts in feeding position, with the shield unlocked and swung forward to permit grazing.

Figures 1, 2:
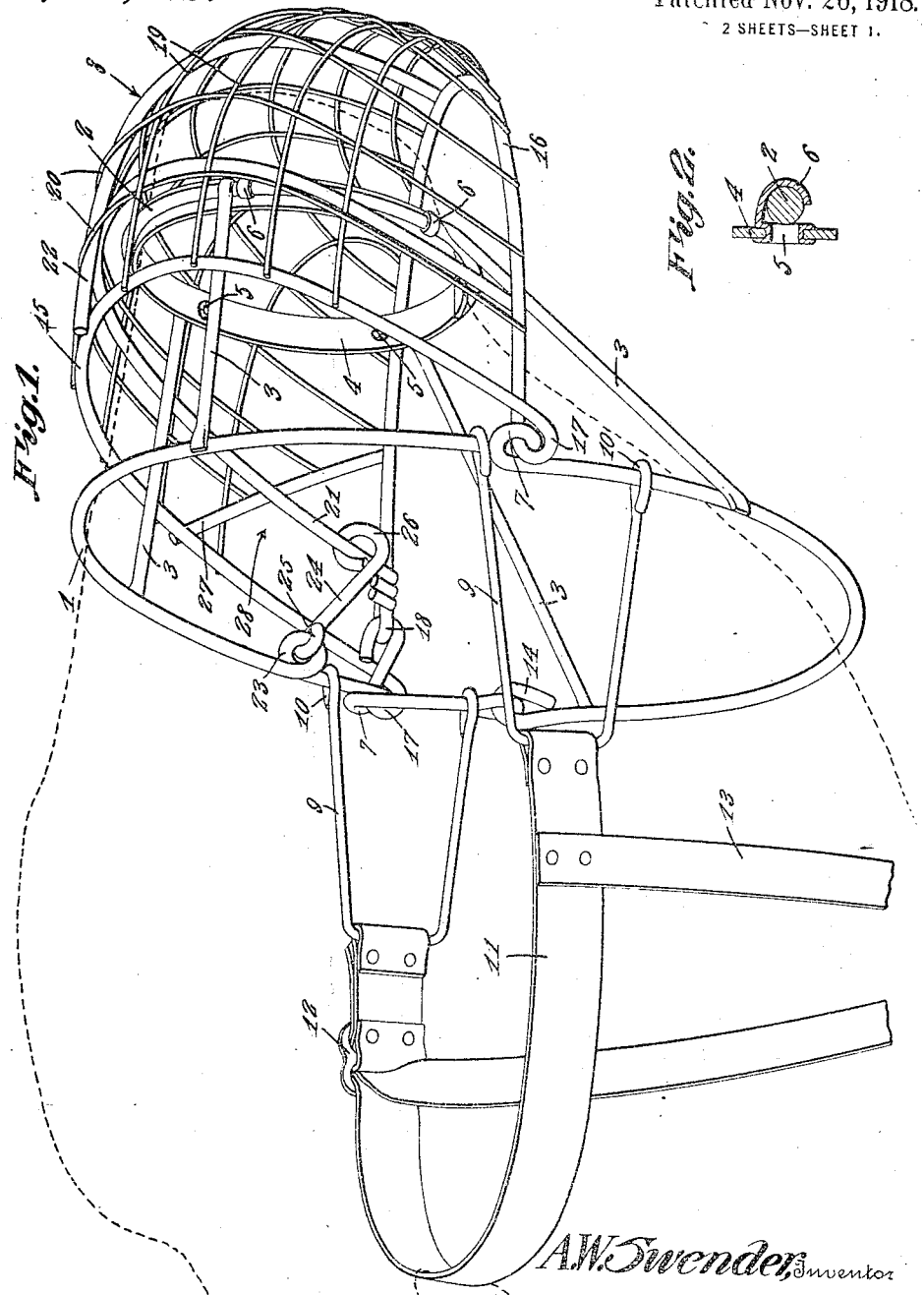
Figure 1 is a perspective view of the weaner in nursing position, showing the shield locked.
Fig. 2 is a sectional detail of the nose pad or cushion.

In carrying out the invention, there is provided a head stall of any suitable size and shape to fit the particular animal for which the device is intended, and comprising a wire frame, including the wire ring 1 and smaller wire ring 2, to surround the nose of the animal, said rings being connected by a plurality of wire stays 3 welded, soldered, or otherwise fastened to said rings. A strip 4 of leather or other soft material is disposed on the interior of the ring, providing a cushion or pad to fit the nose of the animal and prevent chafing or injury thereto. This strip or pad is held in place by means of eyelets 5 clenched therethrough and having hooks 6 embracing the rings 2 on the exterior of the pad. The opposite sides of the ring 1 are provided with outstanding loops 7 for the pivotal connection of the shield or guard 8, and bails or looped members 9 have eyes 10 at their ends pivotally engaging the side portions of the ring 1 at opposite sides of the loops 7. A retaining strap 11 is connected to the intermediate portions of the bails 9, to pass in back of the neck of the animal, and said strap having a buckle 12 which also holds a strap 13 attached to the strap 11 to pass under the animal's neck, whereby to hold the head stall in place. The bails 9 provide convenient means for attaching the straps to the head stall. The ends of the wire forming the ring 1, are looped together, as at 14, or otherwise attached, preferably at one side of said ring.

The shield 8 is constructed of wire, to render it airy, light and not apt to freeze up. The shield 8 has a wire frame comprising the U-shaped loops 15 and 16 diverging from one another and having their ends connected by loops or eyes 17 pivotally engaging the loops 7. The loop 15 ordinarily extends over the head stall, while the loop 16 extends across the nose ring 2. The ends of the wire forming the loops 15 and 16 are looped together, as at 18, or otherwise attached. A meshed wire or reticulated filler is secured to the loops 15 and 16, being bulged or convexed outwardly and composed of interwoven wires 19 and 20. The wires 19 are welded or otherwise secured at one end to the loop 15 and at the other end to the loop 16, while the wires 20 extend transversely and have their ends secured to the limbs of the loop 16. The wire mesh formation of the shield permits the air to circulate therethrough without hindrance, and this shield can swing upwardly or forwardly, when unlocked, permitting the animal to eat and graze.

In order to lock the shield when the head stall is tilted or swung upwardly to nursing position, a wire loop or cross rod 21 is disposed within the shield parallel with the loop 15 and is terminally welded or otherwise secured to the loop 16, said loop or member 21 being held firmly in place by means of the curved wire brace 22 welded or otherwise secured to the intermediate portion of the loop 21 and having its terminals welded or otherwise secured to the intermediate portions of the loops 15 and 16. The ring 1 is provided at one side with an eye or loop 23 for the pivotal connection of a wire latch bar 24 having an eye 25 at one end engaging the eye 23, while the free end of the latch 24 has an eye 26 fitting slidably upon one limb of the loop of member 21. The pivot eye 23 of the latch is spaced forwardly from the pivot eye or loop 7 of the shield 8, and the latch 24 is swingable forwardly and rearwardly in its sliding engagement with the member 21. To permit of free movement of the latch, the wires 20 are cut away at one corner of the shield 8 and are secured to an oblique brace 27 in turn secured to the respective limbs of the loops 15 and 16, providing an opening 28 through which access to the latch can be had for manually moving it, when desired.

When the animal raises or tilts its head to nursing position, or to gnaw a tree or eat branches therefrom, the ring 1 being brought to a substantially vertical or nearly vertical position, the latch 24 will drop by gravity, the shield 8 also swinging by gravity so as to extend across the mouth of the animal, preventing nursing, gnawing of trees, eating of branches, and the like. The latch 24 will act as a prop between the member 21 of the shield and the ring 1 of the head stall, preventing the shield 8 from being swung upwardly by the tossing or shaking of the animal's head. When the animal lowers its head to drink, feed or graze, the latch 24 will swing forwardly by gravity, thereby unlocking the shield, and as the animal's head is moved rearwardly in grazing or feeding, the shield 8 in resting on the ground will be tilted or dragged to the position seen in Fig. 3, the latch 24 sliding forwardly and permitting such movement of the shield away from active position, so as not to interfere with the feeding or grazing of the animal. The shield 8 can have a rolling motion on the ground, in grazing, to move away from the animal's mouth, but when the head is raised, the shield will swing by gravity across the animal's mouth as before.

Having thus described the invention, what is claimed as new is:

1. A device of the character described embodying a head stall, a shield pivotally connected therewith, a latch pivotally connected with the head stall and having an eye at its free end, and a member carried by the shield slidably engaged by said eye for locking and unlocking the shield when the head stall is swung to different positions.

2. A device of the character described comprising a head stall including relatively large and small rings and stays connecting them, means connected to the larger ring for holding it on the head of an animal, a mesh-work shield pivotally connected to the larger ring and swingable over the smaller ring, the shield including a cross rod, and a latch bar pivotally connected with the larger ring and slidably engaging the cross rod for locking and unlocking it when the head stall is swung to different positions.

3. A device of the character described embodying a head stall including relatively large and small rings and stays connecting them, means connected to the larger ring for holding it on the head of an animal, a shield including a frame having diverging loops and a wire mesh filling secured to said loops, the adjacent ends of the shield loops being pivotally connected to the sides of the larger ring, and a latch pivotally connected to the larger ring and having an eye at its free end slidably engaging a part of the shield to lock and unlock it when the head stall is swung to different positions.

In testimony that I claim the foregoing as my own I have hereto affixed my signature in the presence of two witnesses.

ALBERT W. SWENDER.

Witnesses:
JOHN J. KENNEDY,
JOHN P. MOUNT.

Copies of this patent may be obtained for five cents each, by addressing the "Commissioner of Patents, Washington, D. C."